United States Patent [19]

Yagi et al.

[11] Patent Number: 4,508,781
[45] Date of Patent: Apr. 2, 1985

[54] FLUORINATION BY INORGANIC FLUORIDES IN GLOW DISCHARGE

[75] Inventors: Toshiharu Yagi, Takarazuka, Japan; Attila E. Pavlath, Walnut Creek, Calif.

[73] Assignee: The United States of America as represented by the Secretary of Agriculture, Washington, D.C.

[21] Appl. No.: 385,674

[22] Filed: Jun. 7, 1982

[51] Int. Cl.³ .......................... B32B 27/00; B05D 3/06
[52] U.S. Cl. .................................... 428/409; 204/165; 427/40; 428/420; 428/421
[58] Field of Search ...................... 428/409, 420, 421; 427/40; 204/165

[56] References Cited

U.S. PATENT DOCUMENTS

| | | | |
|---|---|---|---|
| 3,964,952 | 6/1976 | Brié et al. | 428/420 X |
| 4,072,769 | 2/1978 | Lidel | 427/40 X |
| 4,188,426 | 2/1980 | Auerbach | 427/40 |
| 4,273,635 | 6/1981 | Beraud et al. | 204/165 |
| 4,364,970 | 12/1982 | Imada et al. | 427/40 |
| 4,391,843 | 7/1983 | Kaganowicz et al. | 427/40 |

Primary Examiner—Thomas J. Herbert
Attorney, Agent, or Firm—Memel, Jacobs, Pierno & Gersh

[57] ABSTRACT

A process for the surface fluorination of a carbon containing synthetic or natural polymer capable of forming a carbon-fluoride bond on fluorination, in a glow discharge reactor, utilizing inorganic fluorides as the fluorination agent.

13 Claims, 7 Drawing Figures

FLUORINATION BY INORGANIC FLUORIDES IN GLOW DISCHARGE

BACKGROUND OF THE INVENTION

Many industries, and especially the textile industry, are constantly in search of new and improved methods of rendering materials soil resistant or for new soil resistant materials.

Soil repellancy is especially important in the textile industry to prolong the usefulness of material and increase the time interval in-between cleanings.

Many compounds, by themselves or as protective layers, have been tried to impart hydrophobic and oleophobic properties to materials. One of the more successful materials possessing these properties have been fluorine compounds. The greater the degree of fluorination the higher the hydrophobicity and oleophobicity. Unfortunately, for the textile industry, as the degree of fluorination of the synthetic material increases the material becomes less pliable and manageable. Highly fluorinated polymers can not be easily moulded and therefore the polymer itself finds limited use in the textile field.

Due to the problems existing with products formed from the polyfluorinated polymers itself, it was decided to cover synthetic or natural fibers with a polyfluorinated polymeric coating. The coating surface would then provide the necessary hydrophobic and olelphobic properties to the underlying material.

One disclosed means for the forming of a polyfluorinated polymeric film was to plasma polymerize a polyfluorinated unsaturated compound, such as perfluorobutane-2. The plasma was generated electrodelessly using plates excited at 13.56 MHz at 70 watts of power (a Plasmatic P.G. 100 watt generator was utilized). Millard et al, J. Applied Polymer Science, 17, 2501–2507 (1973). In this procedure a polymeric film was formed on glass and although the film showed soil repellancy properties, there was little adherency of the film to the glass.

In Plasma Polymerization, ACS Symposium Series No. 108, Pavlath et al, disclose a process for coating, by glow discharge plasma deposition, glass, synthetic polymers and wool with a polyfluoro coating. Once again deposition on glass showed little or no adhesion. Deposition on organic surfaces indicated a fluorocarbon-substrate graft. The source of the fluorocarbon was a polyfluorocarbon, such as perfluoroethylene, perfluoropropylene, perfluorobutane-2, and perfluoroethane. In all cases, solvent extraction of the coated material reduce the fluorine to carbon ratio, thus showing poor adhesion to the substrate. The initial deposition, when a polyfluorounsaturated source is utilized as the fluorocarbon, yielded a fluorine to carbon (F/C) ratio of 1.2:1 to 1.5:1 after about a 15 second treatment. This ratio, after extraction, was reduced to 0.2:1 to 0.3:1. When a polyfluorosaturated source is utilized as the fluorocarbon, an initial deposition having a F/C ratio of about 0.4:1 to 0.55:1, for wool, and 0.6:1 to 0.8:1 for polyethylene was obtained. Solvent extraction removed less fluorocarbon than for unsaturated compounds yielding a deposition having a F/C ratio of 0.4:1 to 0.55:1.

It is theorized that utilizing a polyfluorounsaturated compound as the fluorocarbon source, polymerization of the compounds occurs with weak adhesion between the polymer and substrate. When polyfluorosaturated compounds are utilized as the fluorocarbon source, there is less polymerization and the forming radicals interact with the substrate surface forming a stronger bond.

Millard et al, Textile Research Journal pages 307–313 (May 1972) discloses a continuous process, through low temperature discharge, for the coating of wool yarn to make said yarn soil resistant and shrink resistant. The fluorocarbon utilized was a fluorocarbon derivative of acrylic acid. As in previous cases, the surface coating had a weak interaction or adherence to the wool yarn and on solvent extraction half the coating was removed.

SUMMARY OF THE INVENTION

A new and simple method of forming thin, extraction resistant fluorocarbon layer on the surface of polymeric and natural material has been developed. In this process an inorganic fluoride is injected into a glow discharge reactor containing the substrate to be fluorinated.

In general the inorganic fluoride disassociates in the glow discharge reactor, according to equation (1)

$$XF_n \rightleftarrows XF_{n-1} + F \cdot \qquad (1)$$

wherein the fluoride radical thus formed interacts with the surface carbon molecules of the substrate forming a fluorocarbon coating which imparts hydrophobic and oleophobic properties to the surface of the substrate.

DETAILED DESCRIPTION OF THE INVENTION

Figure 1:
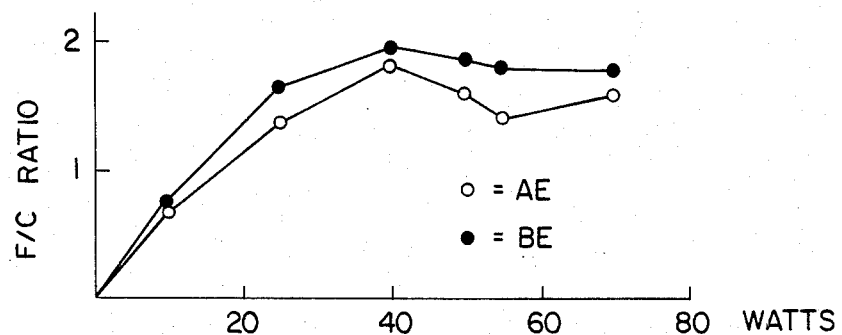
FIG. 1. Graph showing the fluorine to carbon ratio of treated polyethylene as a function of the input power.

It has long been known that fluoropolymers such as polytetrafluoroethylene have excellent surface properties. Unfortunately because of cost and operating difficulties, attention has turned to the impartation of a fluoro carbon surface layer to a less expensive and more easily manipulated polymer or natural fiber.

Fluorination of organic compounds with elemental fluorine is a violent exothermic reaction requiring special handling procedures. The violent nature of this reaction has discouraged the use of elemental fluorine as a commercial process for the fluorination of organic polymers.

It has been known that polyfluoro unsaturated compounds can be polymerized in a plasma system to form polymeric films which are highly cross-linked, insoluble, chemically inert and thermally stable. Unfortunately the films produced do not attach or interact with many substances and thus the film is easily removed. This property detracts from the use of this method to coat synthetic or natural fibers especially those which are to be woven into fabric for garments, carpets and upholstery fabric. Routine dry cleaning of these fabrics would destroy the soil repellancy property of the fabric which is imparted by the polyfluoropolymer.

It has also been known that fluorocarbons are dissociated in a glow discharge apparatus into fluorine radicals and fluorine carbon radicals as illustrated, in equation (2), by tetrafluoromethane (carbon tetrafluoride) dissociation.

$$CF_4 \rightleftharpoons CF_3 \cdot + F^{19} \qquad (2)$$

When the dissociation takes place in the presence of an organic substrate it is possible for each of the radicals to react with the substrate surface as illustrated in equations (3) and (4):

$$F \cdot + C-H \rightarrow C-F + H \cdot \qquad (3)$$

$$CF_3 \cdot + C-H \rightarrow C-CF_3 + H \cdot \qquad (4)$$

The surface-radical interaction results in a strong adherence of the fluorine to the substrate surface.

The $CF_3 \cdot$ radical may also react with itself to form hexafluoroethane $F_3C-CF_3$, which is non-reactive, and depending on the reaction conditions may form longer fluorocarbon chains. As the polymeric fluorocarbon chain increases a chain length is reached which results in deposition of the polymer on the substrate surface. This polymeric chain does not graft onto the surface and blocks other free radicals from combining with the surface of the substrate. The net result is that the substrate has a polyfluoro covering which is easily removed. As will be seen hereinafter in Table 1, losses by extraction of 30 to 57% have been experienced depending upon the starting reactant.

In order to avoid this major disadvantage, it was decided to utilize an inorganic fluoride as the reactant in a glow discharge apparatus. The glow discharge dissociation of inorganic fluoride was found to be similar to the reaction of fluorocarbons (equation 5):

$$XF_n \rightleftharpoons XF_{n-1} \cdot + F \cdot \qquad (5)$$

where X is preferably boron, nitrogen, silicon, sulfur, arsenic, phosphorous or selenium. The reactivity of the fluorine radical from inorganic fluorides is similar to the reactivity of the fluorine from carbon tetrafluoride.

The $XF_{n-1} \cdot$ radicals formed in the glow discharge dissociation of inorganic fluorides have a different reactivity than the $CF_3 \cdot$ radical formed from fluorocarbons. Although dimeric inorganic fluorides are known the continuing reaction of these dimeric compounds with additional $XF_{n-1} \cdot$ radicals is very unlikely. Conditions therefore do not exist for these radicals to form inorganic fluoropolymers which would eventually be deposited on the substrate surface without grafting. X-ray photoelectron spectroscopy (ESCA) studies of a substrate after being subjected to fluorine radicals did not show either inorganic fluoropolymers or $XF_{n-1} \cdot$ grafted to the substrate.

In the utilization of this invention any inorganic fluoride may be used which has a vapor pressure, at room temperature of at least 0.5 Hgmm. Metal fluorides generally have no practical vapor pressures at room temperature. Amphoteric elements generally have lower valent fluorides which are solids and higher valent fluorides which have a useful vapor pressure. For ease in handling, it is preferred that the fluoride utilized in this invention be a gaseous fluoride compound.

Fluoride compounds which can be utilized in this invention include fluorides of boron, nitrogen, oxygen, silicon, phosphorous, sulfur, arsenic, tungstenhexafluoride, antimonypentafluoride and carbonylfluoride. Preferred compounds are nitrogen trifluoride, boron trifluoride and silicon tetrafluoride with nitrogen trifluoride being the most preferred fluorination agent.

The reaction is preferably conducted at about room temperature. Depending on the power input and the size and design of the glow discharge apparatus, the temperature in the reactor may increase during the reaction. It is thus desirable that the heat formed from the coupling of the electric power to the reactor be dissipated. Higher temperatures may be tolerated only if the substrate to be fluorinated does not melt or shrink at the higher temperatures.

The pressure of the system is limited by the reactor design and is preferably not more than 5 Hgmm and more preferably at pressures lower than 5 Hgmm. For practical considerations pressures of about 1 to 2 Hgmm are utilized. At this pressure a steady electric charge can be maintained at a relatively low energy input. Pressures above 10 Hgmm usually require large reactors and would require excessive power to maintain a glow discharge which in turn would raise the temperature to an unacceptable level.

For ease of handling the fluorination reaction, the inorganic fluoride may be mixed with an inert gas such as nitrogen and argon.

As will be seen from the following tables and experiments, the reaction time ranges from about 1 second to about 5 minutes. Changes in the fluorine to carbon ratio are minimal after 1 minute fluorination. The preferred range is about 10 seconds to about 30 seconds. The reaction time is dependent upon energy input and the higher the energy input the shorter the reaction time. In FIG. 1 it is seen that the fluorine to carbon ratio increases rapidly up to about a 25 watt input and then levels off. The exposure time (reaction time) for the runs plotted in FIG. 1 was 3 seconds. In this figure and the remaining figures BE means "before extraction" and AE means "after extraction" and the fluorination agent was nitrogen trifluoride.

Figure 2:
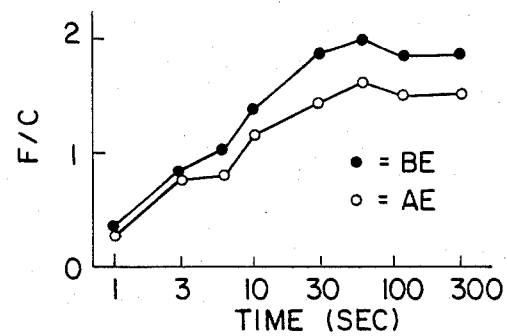
FIG. 2 Graph showing the fluorine to carbon ratio of treated polyethylene as a function of exposure time at 10 watts of input power.
Figure 3:
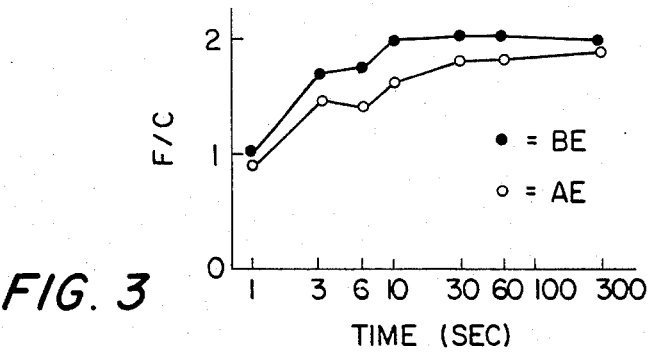
FIG. 3. Graph showing the fluorine to carbon ratio of treated polyethylene as a function of exposure time at 25 watts of input power.
Figure 4A:
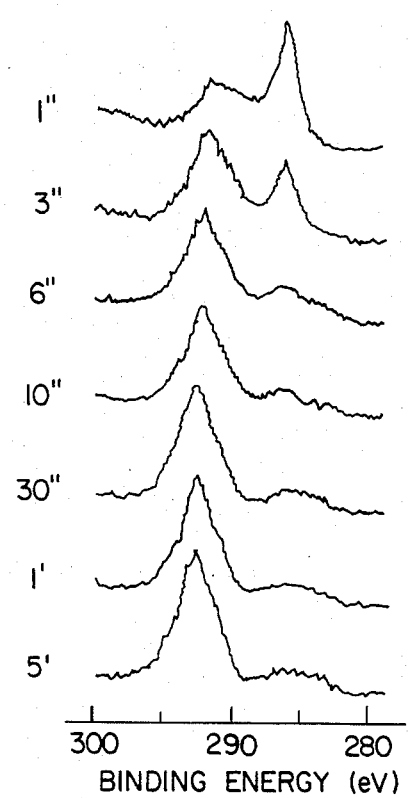
FIG. 4A. Carbon 1s x-ray photoelectron spectra of treated polyethylene at various exposure times, before extraction.
Figure 4B:
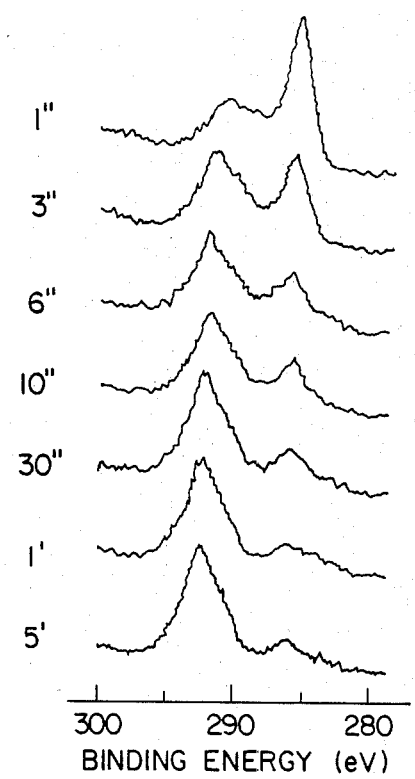
FIG. 4B. Carbon 1s x-ray photoelectron spectra of treated polyethylene, at various exposure times, after extraction.

FIGS. 2 and 3 are a comparison showing the fluorine to carbon ratio (F/C), following fluorination, as a function of exposure with the energy input in FIG. 2 being 10 watts and in FIG. 3, 25 watts. It will be noted that at a 10 watt energy input the maximum F/C ratio was obtained in about a 30 second exposure time and then the ratio leveled off, whereas at a 25 watt energy input the maximum F/C ratio was obtained in about a 10 second exposure time and then the ratio leveled off. Following the directions of this invention it is possible to vary the exposure time and energy input and obtain maximum fluorination.

In the following tables, figures and experiments, the substrate, following fluorination, was extracted with trichlorotrifluoroethane to remove any fluorine which has not bonded to the substrate surface.

Fluoroination, with inorganic fluorides, according to the process of this invention, can be applied to a wide range of materials, both natural and synthetic. The process can be applied to any carbon containing polymer capable of forming a carbon-fluorine bond on fluorination with fluorine radicals, such as C—H and

bonds. The properties of the final product will thus be dependent upon the starting material. Synthetic materials which may be utilized in this fluorination process include polyethylene, polypropylene, polystyrene, polymethylmethacrylate and the like. Natural materials which may be fluorinated by this process include wool, cotton, and silk fibers and the like and textiles made from these materials.

GENERAL FLUORINATION PROCEDURE

The fluorination procedure was generally conducted in a cylindrical glass glow discharge reactor using a 13.56 MHz generator. A near homogeneous field was achieved with capacitive coupling using quarter-cylindrical electrodes. The sample was placed on a glass plate in the center of the glow and the reactant inorganic fluoride introduced, through a flow meter, immediately above the sample. The flow rate was regulated in such a way that the pressure was between 0.2–0.4 torr and a stable glow could be maintained at 10 watts. After the glow discharge treatment the substrate sample was analyzed by x-ray photoelectron spectroscopy (ESCA) to determine the fluorine to carbon ratio. The substrate was extracted (washed) with trichlorotrifluoroethane to remove any loose deposit and the substrate subjected to ESCA analysis.

EXAMPLE 1

A 20×20 m$^2$ piece of polyethylene film was place in a 250 ml glow discharge reactor. The reactor was evacuated and then a flow of argon was introduced at a rate to maintain a 0.2 Hgmm pressure. A glow discharge was created through a capacitive coupling using a 13.56 MHz generator at 25 watts. A flow of fluorination agent was then introduced, immediately above the sample, keeping the total pressure in the reactor below 0.5 Hgmm and ensuring that the glow constantly engulfed the sample. The sample was treated with the fluorination agent for five minutes. The results obtained are shown in Table I.

TABLE I

| Reactant | F/C Ratio BE | AE | Loss % |
|---|---|---|---|
| $NF_3$ | 1.92 | 1.90 | 1 |
| $BF_3$ | 1.12 | 0.93 | 17 |
| $SiF_4$ | 1.12 | 0.92 | 18 |
| $CF_4$ | 1.50 | 1.05 | 30 |
| $C_2F_4$ | 1.44 | 0.63 | 57 |

A review of the results of Table I will show that fluorination, utilizing inorganic fluorides, yields a fluorinate surface layer in which the fluorines are more firmly bound to the surface—hence the less loss of F/C ratio an extraction.

The results in Table I also show the close to theoretical yield obtainable by nitrogen trifluoride. Nitrogen trifluoride has one of the lowest heat of formation of the possible inorganic fluorides which can be utilized in this procedure. It is theorized that glow discharge initiates a slow controlled decomposition of nitrogen trifluoride to its gaseous components, that is, fluorine and nitrogen. This slow release of fluorine may result in a rapid but controlled fluorination of the sample's surface.

The ease of fluorination with nitrogen trifluoride can be seen from FIG. 1 which shows that at a 3 second exposure time, a F/C ratio close to 1 was obtained at an energy level of about 10 watts. Values close to the theoretical F/C value of 2 were obtained at energy levels of 25 watts and above, for a 3 second exposure.

These results are confirmed in FIGS. (2) and (3). In FIG. 2, exposure at a 10 watt energy level shows that fluorination occurred at 1 second, and the F/C ratio increases with time to a maximum at about 30 seconds. At a 25 watt energy input, FIG. 3, the fluorination at 1 second appears to be about 3 times greater than at 10 watts, and reaches a maximum in about 3 to 10 seconds.

EXAMPLE 2

Following the procedure of Example 1 samples of polyethylene, polypropylene, polystrene and polymethylmethacrylate were fluorinated with nitrogen trifluoride at 25 watts for 30 seconds. The results obtained are shown in Table II.

TABLE II

| Polymer | F/C Ratio BE | AE | Loss % |
|---|---|---|---|
| Polyethylene | 1.96 | 1.78 | 9 |
| Polypropylene | 1.85 | 1.70 | 8 |
| Polystyrene | 1.90 | 1.55 | 18 |
| Polymethyl-methacrylate | 2.06 | 1.14 | 45 |

Figure 5:
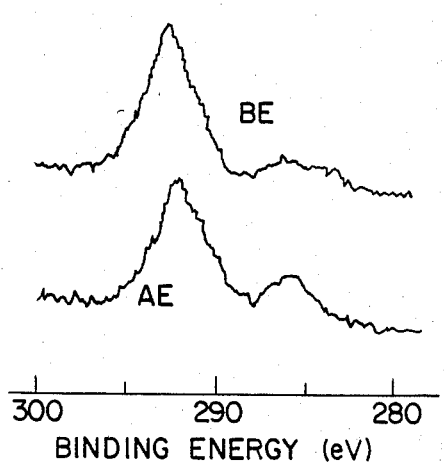
FIG. 5. Carbon 1s x-ray photoelectron spectras of polyethylene, treated for 30 seconds at 25 watts, before and after extraction.
Figure 6:
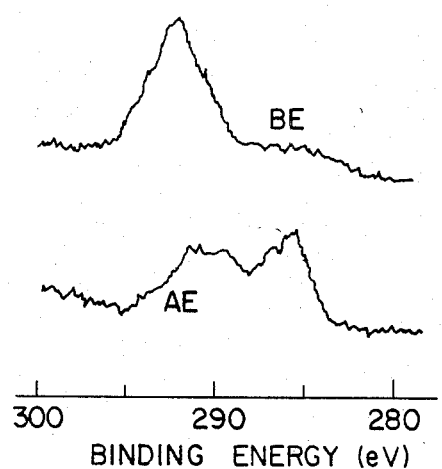
FIG. 6. Carbon 1s x-ray photoelectron spectras of polymethylmethacrylate, treated for 30 seconds at 25 watts, before and after extraction.

From a review of Table II it is apparent that all four polymers were surface fluorinated to yield compounds having close to the theoretical F/C ratio and similar to the value for polytetrafluoroethylene. After extraction, all samples still retained considerable fluorine, however the loss for polymethylmethacrylate was substantial. Comparing FIGS. 5 and 6, it will be seen that fluorinated polymethylmethacrylate not only differed from polyethylene quantitatively, as to fluorine content after extraction, but also qualitatively.

Contact angle measurements, according to W. A. Zisman, Advances in Chemistry, Series 43, ACS, 1964, Chapter 1, shows, Table III, that the surface properties of the four polymers, before extraction, were similar to each and similar to polytetrafluoroethylene.

TABLE III

| Polymer | Contact Angle (Water) degree | | CST[1] (dynes/cm) | |
|---|---|---|---|---|
| | BE | AE | BE | AE |
| Polyethylene | 109 | 114 | 18.6 | 20.8 |
| Polypropylene | 126 | 126 | 19.6 | 22.4 |
| Polystyrene | 112 | 112 | 19.4 | 21.4 |
| Polymethyl-methacrylate | 108 | (wet) | 18.3 | 21.4 |

[1]critical surface tension

Contact angles with water for the untreated polymers were found to be 89, 109, 87 and 90 degrees, respectively and the CST values were over 30 dynes/cm. The CST for polytetrafluoroethylene is 18.5 dynes/cm.

EXAMPLE 3

Repeating the procedure of Example 1, utilizing nitrogen trifluoride as the fluorinating agent and varying the exposure time yield the results shown in Table IV.

TABLE IV

| Exposure time | F/C Ratio BE | F/C Ratio AE | % Loss |
|---|---|---|---|
| 1 sec. | 1.00 | 0.91 | 9 |
| 3 sec. | 1.71 | 1.48 | 13.5 |
| 6 sec. | 1.77 | 1.42 | 19.8 |
| 10 sec. | 2.05 | 1.73 | 15.6 |
| 30 sec. | 1.96 | 1.78 | 9.2 |
| 1 min. | 2.05 | 1.80 | 12.2 |
| 5 min. | 1.92 | 1.90 | 1 |

Table IV once again indicates that, with nitrogen trifluoride, maximum fluorination occurs in about 10 seconds.

EXAMPLE 4

Following the procedure of Example 1 but at an energy input of 10 watts, the following results were obtained at the various exposure times shown.

TABLE V

| Exposure Time | F/C Ratio BE | F/C Ratio AE | % Loss |
|---|---|---|---|
| 1 sec. | 0.32 | 0.25 | 21.9 |
| 3 sec. | 0.85 | 0.77 | 9.5 |
| 6 sec. | 1.03 | 0.80 | 22.3 |
| 10 sec. | 1.38 | 1.15 | 16.7 |
| 30 sec. | 1.87 | 1.44 | 21.9 |
| 1 min. | 1.99 | 1.49 | 25.1 |
| 2 min. | 1.85 | 1.49 | 19.5 |
| 5 min. | 1.86 | 1.51 | 18.9 |

The values in Table V show that even at lower energy input, fluorination begins at 1 second and attains a maximum at about 30 to 60 seconds. Lower energy input therefore requires longer exposure times.

EXAMPLE 5

Following the procedure of Example 1, utilizing nitrogen trifluoride as fluorination agent and varying the energy input at a constant 3 second exposure time, yielded the values shown in Table VI.

TABLE VI

| Energy Input (Watts) | F/C Ratio BE | F/C Ratio AE | % Loss |
|---|---|---|---|
| 10 | 0.85 | 0.77 | 9.4 |
| 25 | 1.71 | 1.48 | 14.4 |
| 40 | 2.00 | 1.89 | 5.5 |
| 50 | 1.89 | 1.65 | 12.6 |
| 55 | 1.85 | 1.50 | 18.9 |
| 70 | 1.87 | 1.69 | 9.7 |

In the above example the glow or radio frequency reactor utilized was a glass reactor having a 250 ml capacity. Other sized reactors can also be used with the proper adjustment as to energy input to achieve results comparable to those attained in the above examples.

The radio frequency generator utilized in the above example was a 13.56 MHz generator with a 100 watt energy output. This frequency was selected since it was one of the few frequencies permitted for use by the FCC which did not interfere with radio broadcasts. Other radio frequencies could therefore also be utilized. The energy output of the generator can also be greater or smaller than 100 watts.

In addition to the radio frequency generator utilized, for practical considerations and convenience, in the above examples, other generators known to those skilled in this art to produce glow discharges, such as microwave generators, low frequency generators and the like can also be utilized at an appropriate energy output.

Although the fluorination described in the Examples is a batchwise process, the process can be easily conducted as a continuous process.

While the invention has been described in connection with specific embodiments thereof, it will be understood that it is capable of further modifications and this application is intended to cover any variations, uses, or adaptations of the invention following, in general, the principles of the invention and including such departures from the present disclosure as come within known or customary practice within the art to which the invention pertains and as may be applied to the essential features hereinbefore set forth, and as follows in the scope of the appended claims.

What is claimed is:

1. An essentially surface fluorinated carbon containing synthetic or natural polymer, the fluorinated surface of which is comprised of carbon-fluorine entities and has a ratio of fluorine to carbon in the range of about 1.14 to about 1.82, the surface of said polymer prior to fluorination being capable of forming a carbon-fluorine bond on fluorination with fluorine radicals derived from inorganic fluoride vapors dissociated in an activated glow discharge reactor.

2. An essentially surface fluorinated carbon containing polymer is described in claim 1 wherein said polymer is a synthetic polymer.

3. An essentially surface fluorinated carbon containing polymer as described in claim 2 wherein the critical surface tension of said fluorinated surface is in the range of from about 20.8 to about 22.4 dynes/cm.

4. An essentially surface fluorinated carbon containing polymer as described in claim 2 wherein said synthetic polymer is polyethylene.

5. An essentially surface fluorinated carbon containing polymer as described in claim 2 wherein said synthetic polymer is polypropylene.

6. An essentially surface fluorinated carbon containing polymer as described in claim 1 wherein said polymer is a natural polymer.

7. An essentially surface fluorinated carbon containing polymer as described in claim 6 wherein said natural polymer is wool.

8. An essentially surface fluorinated carbon containing polymer as described in claim 6 wherein said natural polymer is cotton.

9. An essentially surface fluorinated carbon containing synthetic or natural polymer, the fluorinated surface of which has been obtained by:
   a. introducing a polymer surface to be fluorinated into an activated glow discharge reactor, and
   b. subjecting said surface within said reactor to dissociated inorganic fluoride vapors for a predetermined exposure time period.

10. An essentially surface fluorinated carbon containing polymer as described in claim 9 wherein said inorganic fluoride is selected from the group consisting of nitrogen trifluoride, boron trifluoride and silicon tetrafluoride.

11. An essentially surface fluorinated carbon containing polymer as described in claim 9 wherein said inorganic fluoride is nitrogen trifluoride.

12. An essentially surface fluorinated carbon containing polymer as described in claim 11 wherein said polymer is a synthetic polymer.

13. An essentially surface fluorinated carbon containing polymer as described in claim 12 wherein said synthetic polymer is polyethylene.

* * * * *